March 16, 1937. B. M. LAIR 2,073,939
BEET DIGGING ATTACHMENT FOR TRACTORS
Filed March 28, 1936
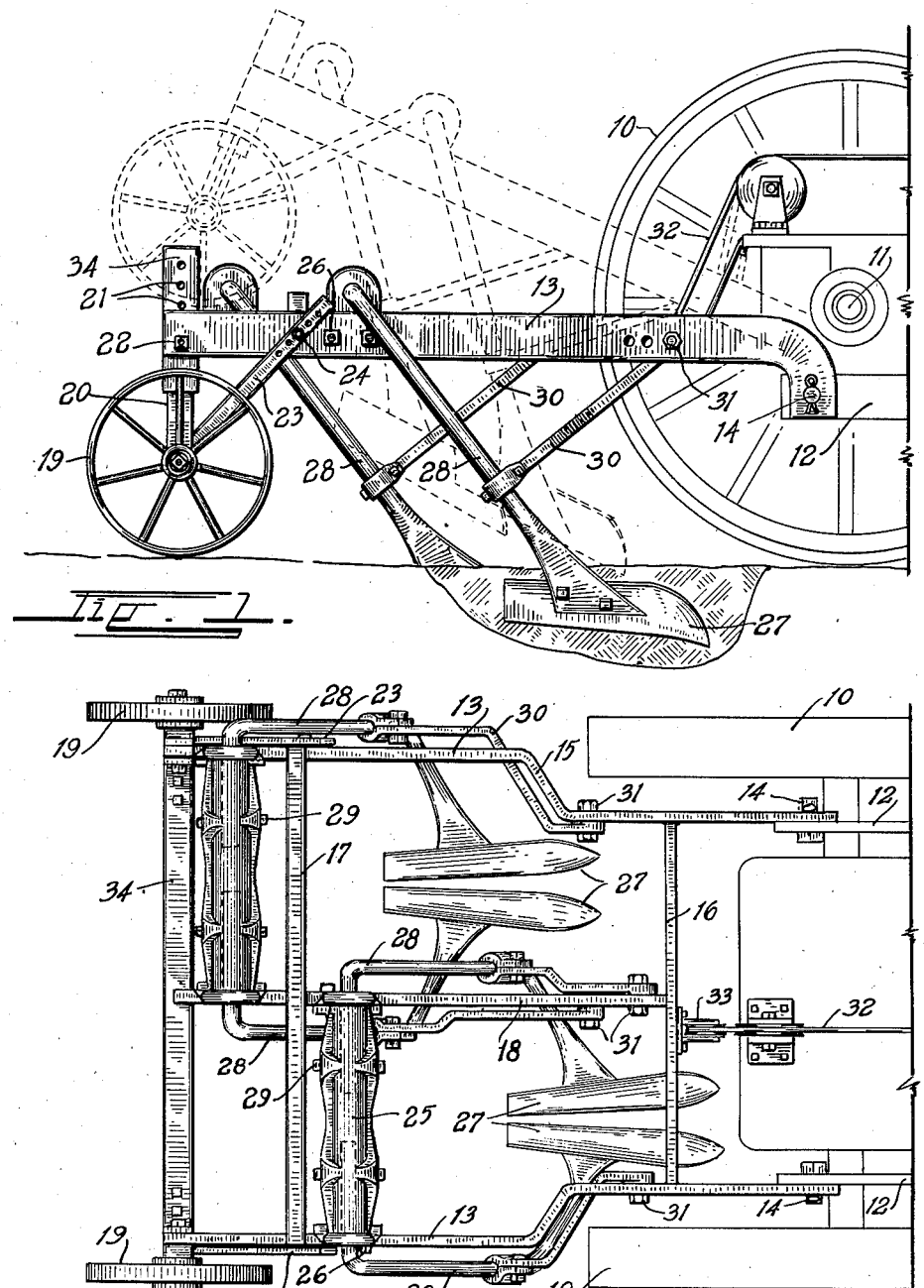
INVENTOR.
BERTON M. LAIR
BY
ATTORNEY.

Patented Mar. 16, 1937

2,073,939

UNITED STATES PATENT OFFICE 2,073,939

BEET DIGGING ATTACHMENT FOR TRACTORS

Berton M. Lair, Eaton, Colo.

Application March 28, 1936, Serial No. 71,436

8 Claims. (Cl. 55—106)

This invention relates to a beet digging attachment for tractors and more particularly to the type of attachment shown in applicant's copending application, Serial No. 25,409. The principal object of the invention is to provide a simple, efficient, supporting frame for beet digging plows which can be attached directly to a tractor so as to follow directly behind the same and dig the beets in the two adjacent rows over which the tractor is travelling.

Another object of the invention is to so construct the device that the plows can be easily and quickly elevated out of contact with the ground while turning the tractor, and so that it can be readily adjusted both as to width of row spacing and depth of digging.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 is a side elevation of the improved digging attachment illustrating it in the operating position on a typical tractor.

Fig. 2 is a plan view of the attachment.

In the drawing, a typical tractor is indicated with its drive wheels at 10, its rear axle at 11, and its draw bars at 12.

The invention comprises a frame consisting of two side bars 13 turned downwardly at their forward extremities to receive draw bar pins 14 which connect them with the draw bars 12. The side bars 13 are offset outwardly as indicated at 15 so as to extend outwardly behind the drive wheels 10 of the tractor. The side bars are maintained in their proper spaced relation by means of a front cross bar 16 and a rear cross bar 17. A middle bar 18, similar to the side bars 13, extends longitudinally between the cross bars 16 and 17 midway between the side bars 13.

The rear extremities of the frame are supported on trailing wheels 19, carried on the lower extremities of downwardly extending struts 20. The struts 20 extend downwardly from the corners of a U-shaped bracket bar 34, the extremities of which are turned upward inside the side bars. Each of the upright extremities of the bar 34 is provided with a series of holes 21. An attachment bolt 22 secures each upright to its side bar 13. By varying the position of the attachment bolts 22 in the holes 21, the height of the rear of the frame can be regulated. A brace arm 23 extends forwardly from each of the uprights 20, to a pivot bolt 24 on the side bars 13.

A receiving sleeve 25 extends between the middle bar 18 and each of the side bars 13. One of the sleeves 25 is placed forwardly of the other. These sleeves are preferably of cast metal and provided with downwardly extending ears by means of which they are bolted to the bars 13 and 18 by means of suitable bolts 26. The digging plows, illustrated at 27, are carried on the lower extremities of bent plow beams 28. Each plow beam extends outwardly from one of the plows 27 thence upwardly around one of the frame bars thence inwardly into the extremity of one of the sleeves 25. The plow beams are locked in position in the sleeves by means of suitable set screws 29.

Each plow beam 28 is provided with a brace rod 30 extending forwardly and upwardly to connection bolts 31 on the horizontal bars 13 and 18. A series of holes is provided for each connection bolt 31 so that its forward and back position may be varied as desired.

A lifting cable 32 is trained from the tractor around a sheave wheel 33 on the horizontal bar 16 thence upwardly to any suitable reel or lever, by means of which the entire frame may be elevated about its draw bar pins 14 to the broken line position of Fig. 1 when not in use.

The device is capable of universal adjustment, for instance the depth of the plows 27 can be regulated by the setting of the bolts 22 in the holes 21. The angle or suction of the plows can be regulated by varying the point of the attachment bolts 31. The spacing of the plows from each other in each pair and the spacing of the pairs from each other can be regulated by loosening the set screws 29 and varying the position of the plow beams 28 in the collars 25.

It is desired to call attention to the staggered relation of the plow blades 27, one pair being positioned ahead of the other pair. This prevents the earth thrown up by one plow from interfering with the dirt being thrown up by the other plow, so as to reduce the drag and prevent undue covering of the dug beets. The lifting plows 27 may have any suitable design.

In use the tractor drive wheels 10 span two rows of beets. The trailing wheels 19 follow the tractor wheels outside the two rows to be dug. At the end of the rows the frame is elevated by means of the cable 32, the tractor is turned and the next two rows are dug.

Tractor attachments have been made for this purpose which extend the plows at the sides of the tractor. With such a device it is impossible to pull adjacent rows. The device pulls alternate rows and picks up the middle row on the return trip. This requires the tractor to travel over the loose soil thrown from the rows. With the present device the tractor always travels over hard unbroken ground.

The downwardly turned forward extremities on said side bars cause the pull of the tractor to be exerted downwardly so as to pull the plows into the ground.

Another advantage of placing the plows out of lateral alignment with each other, or in staggered relation, is that it enables the plow beams in each pair to be spread relatively wide apart from each other, so that they will not interfere with foliage. If it were not for this staggered arrangement, the inner plow beams of each pair could not be placed beyond the center line of the two rows, without interfering with each other, and if they were not placed beyond the center line of the two rows, they would interfere with the passage of tops or foliage.

While a specific form of the improvement has been described and illustrated herein, it is desired to be understood that the same may be varied, within the scope of the appended claims, without departing from the spirit of the invention.

Having thus described the invention, what is claimed and desired to be secured by Letters Patent is:—

1. A frame for supporting beet digging plows behind a tractor comprising: two substantially horizontal side bars, the forward portion of each of said bars being inset from the rearward portion thereof; means for attaching the forward extremities of said bars to a tractor; a middle bar parallel to and between said side bars; a sleeve extending from each side bar to said middle bar; two pairs of plow beams, each pair having its upper extremities turned into the extremities of one of said sleeves; a digging plow secured on the lower extremity of each of said plow beams; and means for supporting the rearward extremity of said frame.

2. A frame for supporting beet digging plows behind a tractor comprising: two substantially horizontal side bars; means for attaching the forward extremities of said bars to a tractor; a middle bar parallel to and between said side bars; a sleeve extending from each side bar to said middle bar; two pairs of plow beams, each pair having its upper extremities turned into the extremities of one of said sleeves; a digging plow secured on the lower extremity of each of said plow beams; means for locking said upper extremities in said sleeves at any desired position therein; and means for supporting the rearward extremity of said frame.

3. A frame for supporting beet digging plows behind a tractor comprising: two substantially horizontal side bars, the forward portion of each of said bars being inset from the rearward portion thereof; means for attaching the forward extremities of said bars to a tractor; a middle bar parallel to and between said side bars; a sleeve extending from each side bar to said middle bar; two pairs of plow beams, each pair having its upper extremities turned into the extremities of one of said sleeves; a digging plow secured on the lower extremity of each of said plow beams; braces extending from said plow beams to said frame; means for varying the position of said braces; and means for supporting the rearward extremity of said frame.

4. A frame for supporting beet digging plows behind a tractor comprising: two substantially horizontal side bars; means for attaching the forward extremities of said bars to a tractor; a middle bar parallel to and between said side bars; a sleeve extending from each side bar to said middle bar; two pairs of plow beams, each pair having its upper extremities turned into the extremities of one of said sleeves; a digging plow secured on the lower extremity of each of said plow beams; and means for supporting the rearward extremity of said frame, one of said sleeves being positioned ahead of the other sleeve so as to place the pairs of digging plows out of lateral alignment.

5. A frame for supporting beet digging plows behind a tractor comprising: two substantially horizontal side bars, the forward portion of each of said bars being inset from the rearward portion thereof; means for attaching the forward extremities of said bars to a tractor; a middle bar parallel to and between said side bars; a sleeve extending from each side bar to said middle bar; two pairs of plow beams, each pair having its upper extremities turned into the extremities of one of said sleeves; a digging plow secured on the lower extremity of each of said plow beams; a U-shaped bracket beam having its upturned extremities secured to the rearward extremities of said side bars; and wheels carried from said U-shaped bracket beam for supporting the rear of said frame.

6. A frame for supporting beet digging plows behind a tractor comprising: two substantially horizontal side bars, the forward portion of each of said bars being inset from the rearward portion thereof; means for attaching the forward extremities of said bars to a tractor; a middle bar parallel to and between said side bars; a sleeve extending from each side bar to said middle bar; two pairs of plow beams, each pair having its upper extremities turned into the extremities of one of said sleeves; a digging plow secured on the lower extremity of each of said plow beams; a U-shaped bracket beam having its upturned extremities secured to the rearward extremities of said side bars; wheels carried from said U-shaped bracket beam for supporting the rear of said frame; adjustable bolts securing said upturned extremities to said side bars; braces extending from an adjustable connection with said frame to brace said U-shaped bracket beam; and means for adjustably securing the forward extremities of said braces to said frame.

7. A beet digging attachment for tractors comprising: a substantially horizontal frame; means for attaching the forward extremity of said frame to a tractor; wheels supporting the rearward extremity of said frame; two tubular sleeve members horizontally supported by said frame; two pairs of plow beams, each pair having its upper extremities turned into the extremities of one of said sleeve members; and a digging plow secured on the lower extremity of each of said plow beams.

8. A beet digging attachment for tractors comprising: a substantially horizontal frame; means for attaching the forward extremity of said frame to a tractor; wheels supporting the rearward extremity of said frame; two tubular sleeve members horizontally supported by said frame; two pairs of plow beams, each pair having its upper extremities turned into the extremities of one of said sleeve members, a digging plow secured on the lower extremity of each of said plow beams, said sleeve members extending laterally of said frame and being positioned out of lateral alignment with each other so that the plow beams turned into their inner extremities may overlap each other; and means for securing said plow beams at any desired extended position in said sleeves.

BERTON M. LAIR.